Sept. 12, 1961 F. E. McCOMB 2,999,284
ALIGNING GAUGE FOR FLEXIBLE HINGED FASTENERS
Filed Oct. 8, 1959
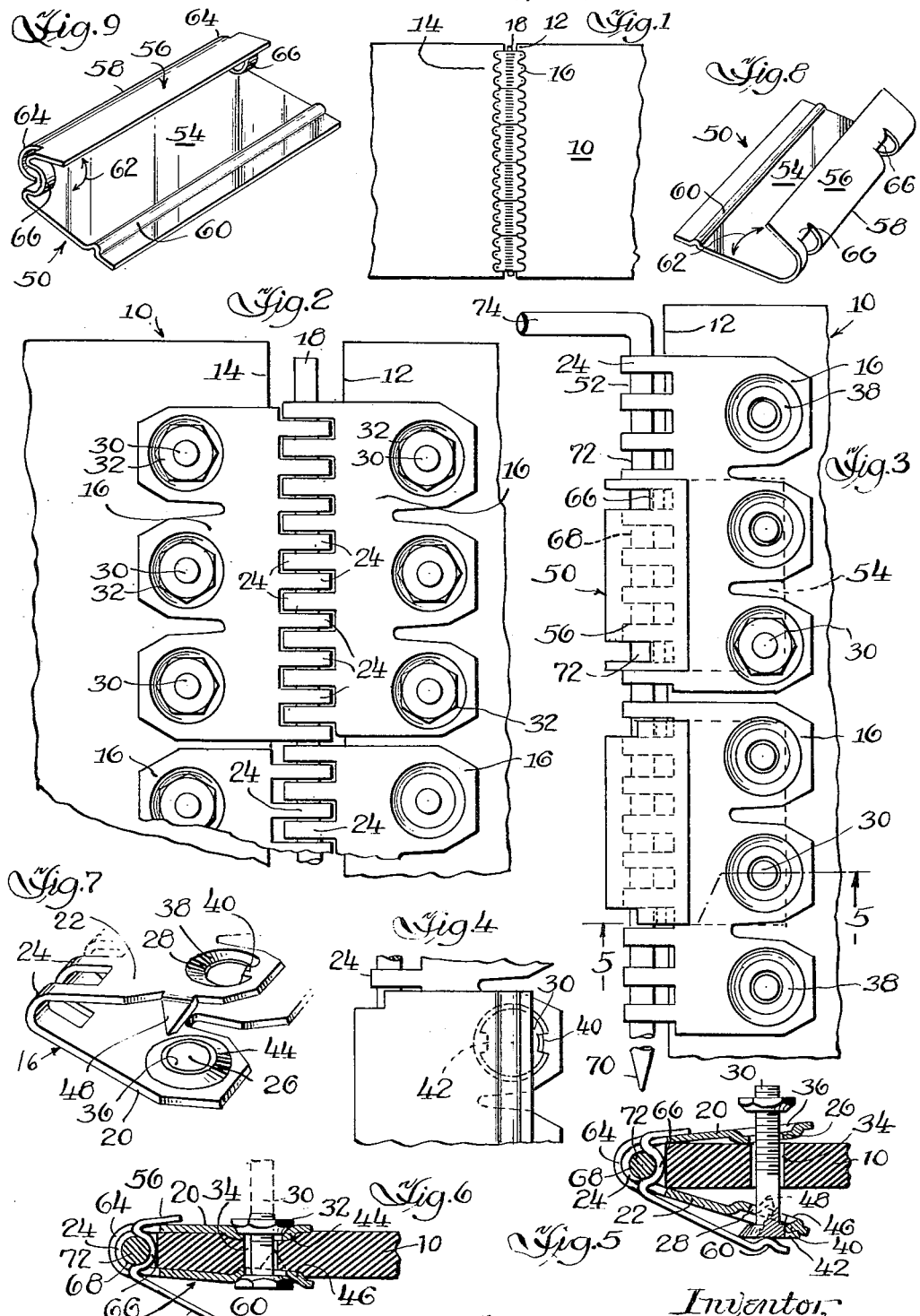
Inventor,
Frank Ellsworth McComb,
By Soans, Anderson, Luedeka & Fitch, Attys.

United States Patent Office 2,999,284
Patented Sept. 12, 1961

2,999,284
ALIGNING GAUGE FOR FLEXIBLE
HINGED FASTENERS
Frank Ellsworth McComb, Oak Park, Ill., assignor to Flexible Steel Lacing Company, a corporation of Illinois
Filed Oct. 8, 1959, Ser. No. 845,236
3 Claims. (Cl. 24—33)

This invention relates to the art of material handling and more specifically to the belts used in connection therewith. It is specifically directed to a gauge adapted for aligning a plurality of hinge type fasteners during the process of attaching the fasteners to the ends of a conveyor belt or the like, so that the belt will run true.

Conveyor, elevator, and power transmission belts are widely used in industry. Various forms of fasteners are utilized in connection with such belts to provide a strong joint between ends and splices to permit the belt to travel freely and smoothly longitudinally as well as around pulleys in making the desired turns. For various applications, a fastener having an easily separable hinged joint construction has been found to be extremely useful. Conveyor belts with hinged type fasteners are quite useful in carrying bulk materials such as coal, rock, sand, grain and other products. Under such conditions of use it is often desirable to have a longitudinal trough or depression formed by permitting the belt to assume a concave shape in transverse section while loaded to increase its capacity, prevent spillage, and lower maintenance costs.

To permit a continuous belt to trough properly, it is advisable to utilize a plurality of narrow belt fasteners at the joint between abutting belt ends rather than a single but relatively wide and transversely rigid fastener. The usual practice is to use a series of such narrow fasteners on the belt ends joined by a common flexible hinge pin. One form of such fasteners found particularly desirable and used in connection with this invention is shown in Patent No. 2,477,855 issued to Hugh J. Beach.

A suitable templet is used to properly locate a series of holes to affix the belt fasteners in the marginal portions of the belt ends. The holes in the belt can be formed in any desirable manner. Normally, the diameter of the holes is larger than the diameter of the shanks of the bolts or rivets that may be used to attach the fasteners to the belt.

The fasteners are disposed along the edge of the belt and the securing means, preferably threaded bolts, are inserted through the fasteners and through the holes formed in the belt. If the securing means are tightened before the fasteners are aligned, the fasteners will not be spaced properly as desired along the edge because it is difficult to center properly by hand the bolt shanks within the larger holes. Thus, the fasteners will not be in proper alignment, and the loops of the fasteners through which the hinge pin common to both sides of the joint is insertable will not intermesh properly with the loops on the fasteners attached to the abutting end of the belt.

It is highly desirable, therefore, in order to secure proper alignment and also to assure a longer life for the joint that the fasteners be held in fixed, positive alignment during the tightening of the fastening bolts.

One of many objects of the present invention is to provide an effective but simple device for quick and accurate alignment of fasteners during their attachment to the ends of a belt not only in relationship with one another on the same end of the belt but also in proper relationship with the adjacent belt end.

A further object of my invention is to provide a gauge whereby the bolts to secure the fasteners in position on the belt can be properly spaced within the oversize bolt holes into which they are inserted to permit the fasteners to form a proper countersink and allow displacement of belt material into the holes.

Further objects of the invention are to provide an improved gauge for aligning the separable sections of the hinged fasteners as they are tightened onto the belt; to provide a tool in combination with a gauge to simplify attachment of a series of hinged fasteners to the abutting ends of the belt; and to provide a tool of the type described which is of simple construction, efficient in operation, and rugged and durable during use.

Further objects and advantages of my invention will be readily understood upon reference to the following specification and accompanying drawings, wherein a preferred embodiment of the invention is exemplified.

In the drawings:

FIGURE 1 is a fragmentary top plan view of a belt joint showing a series of fasteners properly aligned;

FIGURE 2 is an enlarged fragmentary top plan view of the junction between belt ends;

FIGURE 3 is a fragmentary top plan view showing one end of the belt with the aligning gauge and rod applied to certain fasteners;

FIGURE 4 is a fragmentary enlarged detail of the underside of the belt with the gauge and rod applied to a fastener;

FIGURE 5 is a transverse section taken along the line 5—5 of FIGURE 3;

FIGURE 6 is a view similar to that of FIGURE 5, but showing the fastener secured in operative position;

FIGURE 7 is a fragmentary view in perspective of the bottom side of one of the fasteners; and FIGURES 8 and 9 are respectively perspective views of the preferred gauge, and a modification thereof.

As shown in the drawings, the improved aligning means is used on a belt 10 having ends 12 and 14 which are flexibly connected by a series of flexible belt fasteners 16 more fully described in Patent No. 2,477,855. These when properly aligned by means of my improved gauge will intermesh and hold together in such intermeshed relationship by means of a hinge pin or shaft 18 shared in common by the series of fasteners 16 attached respectively to ends 12 and 14 of the belt 10.

Each fastener 16 is preferably made of a relatively heavy plate of somewhat flared U-shaped form as shown in FIGURE 7. It comprises an upper arm 20 connected with a lower arm 22 by an intermediate portion recessed to form laterally separated loops 24. The arms 20 and 22 are provided with alignable openings 26 and 28 respectively, through which bolts 30 or the like may be inserted when the said arms are applied to embrace an end of the belt. Associated threadedly with said blots 30, are the customary nuts 32. Formed in the belt 10 adjacent the ends thereof are holes 34 adapted to receive therein the shanks of the bolts 30. Around the openings 26 and 28 in the said arms 20 and 22 respectively are provided countersinks 36 and 38. The countersink 38 around the opening 28 in the arm 22 is interrupted and has an inwardly radially extended lug or detent 40 adapted to engage with and fit within the notch 42 on the conical end of bolt 30. The countersink 36 about the opening 26 on the arm 20 is free of any detents and is adapted to receive the conically flared nut 32 when threadedly engaged on the shank of the bolt 30.

The inner surfaces of the arms 20 and 22 about their respective openings 26 and 28 have flared projecting rings 44 and 46 respectively. These, when the arms 20 and 22 are tightened about the end of the belt 10 compress the material of the belt 10, and partially displace it to provide a self made seat for the fastener 16 as further illustrated in FIGURE 6.

There is also provided on the fastener as a matter of additional safety a tooth or prong 48 that extends perpendicularly and inwardly from the edge of the arm 22, whose function is to become embedded within the belt 10 to anchor the fastener 16 to the belt 10. To aid in the penetration of the belt 10 by the prong 48, the arm 20 is wider than the arm 22 and acts as a bearing plate against which the belt 10 bears when the arms 20 and 22 are drawn together. The fasteners 16 are attached to the ends 12 and 14 of the belt 10 by means of the bolt 30 whose shank is inserted through the opening 28 in the arm 22, the hole 34 in the belt 10, and through the related opening 26 in the arm 20 to be engaged upon protrusion by the nut 32. The latter, when tightened, draws the arms 20 and 22 together as shown more specifically in FIGURE 6 of the drawings.

As indicated above, the conical head of each bolt 30 has diametrically opposed notches 42, each adapted for receiving the radially extending lug or detent 40 extending within the interrupted countersink 38 around the respective opening 28 in the arm 22. When the head of the bolt 30 is engaged by the detent 40, the bolt is prevented from turning freely as the nut 32 is being applied to draw together the arms 20 and 22

Since the arms 20 and 22 of the fastener 16 initially diverge, it is necessary that the openings 26 and 28 in the said arms 20 and 22 respectively be large enough to permit insertion of the bolt 30 through the openings 26 and 28 and the hole 34 of the belt 10.

My improved gauge and aligning tool consists of two sections, a gauge section or clip 50 and a straight aligning rod 52.

The clip 50 is substantially a flaring or diverging U-shaped member having a longer leg 54 and a shorter leg 56 joined together by an intermediate semicircular portion or base section 58. The legs 54 and 56 extend laterally in a somewhat flaring manner from the base section 58 and are adapted to embrace the flaring arms 20 and 22 of the U-shaped fastener 16. The longer leg 54 of the clip 50 extends laterally and is at least substantially co-extensive with the area of the arm 22 of the fastener 16. Along the marginal portion of the leg member 54 and in parallel relationship with the edge thereof, a transverse ridge 60 is provided which is positioned to bear against the heads of the bolts 30, to retain the same in proper position within the fasteners to permit tightening of the nuts 32.

The shorter leg 56 of the clip member 50 is adapted to embrace the arm 20 of the fastener 16.

It should be noted that the legs 54 and 56 of the clip member 50 diverge outwardly from the base section 58 through an angle 62. This angle 62 is slightly greater than the angle between the arms 20 and 22 of the fastener 16. If made of spring steel the clip 50 and its legs 54 and 56 will be adapted to engage more easily and snap on the arms 20 and 22 not only to retain the heads of the bolts 22 in the openings 28 but also if desired to align two or more of the fasteners 16 loosely connected to the end of the belt 10.

Located on each of the ends 64 of the base section 58 of the clip 50 and disposed between the legs 54 and 56 is an inwardly struck semi-circular band portion or saddle 66. It is obvious that one or more similar saddles 66 can be formed in other parts of the said base section 58, as desired. However I have found that effective alignment can be obtained and proper spacing accomplished between the edges of the fasteners 16 when the clip 50 has at least two such saddles 66. These are spaced apart by about the length of the clip 50 but shorter spacings may also be used if desired. The width of the band forming the inwardly struck portion or saddle 66 is so selected that it is adapted to fit within the lateral spaces between the loops 24 of the fastener 16.

Thus when the clip 50 embraces the fastener 16 the saddles 66 are adapted to intermesh between the loops 24 of the fastener 16. The saddles 66 abut against the end 12 or 14 of the belt 10 to space the fasteners in an aligned position in relation to the edge of the belt 10 by means of the clip 50. Obviously a series of fasteners 16 loosely attached to the end 12 of the belt 10, can be thus aligned by a number of clips 50 placed in an end to end abutting relationship to define within the thus engaged fasteners 16 and the saddles 66 a longitudinal bore 68. The bore 68 is adapted to receive an aligning rod 52 which engages the saddles 66 of clips 50 and the loops 24 of the fasteners 16 in co-axial alignment.

The aligning rod 52 is preferably a solid circular rod member having a shank 72 with a point 70 at one end and a handle 74 at its other end. The shank 72 is preferably sufficiently long to span a series of adjoining fasteners 16 that may be loosely connected to the end of the belt 10. However, if desired, it can be short or long to accommodate as many fasteners as can be conveniently handled by the work crew.

In operation, when the desired number of adjacent loosely connected fasteners 16 are applied to the belt end, the clips 50 are applied and their respective saddles 66 intermeshed within the spaces between the loops 24 of the fasteners 16. The aligning rod 52 is then inserted through the longitudinal bore 68 formed within the intermeshed saddles 66 and loops 24. The point 70 on the aligning rod 52 facilitates the entry of the rod into the bore. Thus the entire series of loosely connected fasteners 16 on the end of the belt 10, are held by means of the aligning rod 52 in a unitary assembly and in properly aligned relationship with one another. After alignment, the loosely connected fasteners 16 are tightened to the end of the belt 10, and the aligning rod 52 removed from within the bore 68, whereby the fasteners 16 will remain in alignment and be properly spaced apart ready for joining with a similarly provided series of fixed fasteners 16 on the adjacent end of the belt 10. After removal of the clip 50 from the fasteners 16, and when the loops 24 of the fasteners 16 affixed in the respective ends 12 and 14 are properly intermeshed, a hinge pin 18 is inserted and the ends 12 and 14 are thus joined to provide a flexible belt joint.

Although but one specific embodiment of this invention has been herein shown and described, it will be understood that details of the construction shown may be altered without departing from the spirit of the invention as defined by the following claims.

I claim:

1. A clip for use in attaching to the end of a belt a fastener incorporating a pair of flaring arms which are interconnected by a series of loops adapted for engagement with a hinge pin and which have aligned apertures for receiving a bolt having means engageable with co-operating means associated with the aperture in one of the arms to prevent rotation of the bolt relative to the fastener, whereby when the bolt is passed through the apertures in the arms and through an opening in the belt, a nut can be threadedly engaged with the bolt to tightly clamp the arms to the opposed faces of the belt, said clip comprising a substantially U-shaped plate having a resilient, arched base section and a pair of arms flaring from said base section at an angle corresponding generally to the flare of the arms of the fastener, one of said arms extending from said arched base section for a greater distance than the other of said arms, whereby the resilient characteristic of said base section affords snap-on assembly of said clip to the fastener and affords engagement of said one arm with the head of the bolt so as to initially engage the rotation-preventing co-operating means of the bolt and the aperture in the one arm of the fastener.

2. Means for use in attaching to the end of a belt a fastener incorporating a pair of flaring arms which are interconnected by a series of loops adapted for engagement with a hinge pin and which have aligned apertures for receiving a bolt having means engageable with means associated with the aperture in one of the arms to prevent rotation of the bolt relative to the fastener, whereby when the bolt is passed through the apertures in the arms and through an opening in the belt, a nut can be threadedly engaged with the bolt to tightly clamp the arms to the opposed faces of the belt, said attaching means comprising a clip including a substantially U-shaped plate having an arched base section with a curvature adapted for embracing the outer surfaces of the loops and inwardly turned saddle portions for defining, together with the inner surfaces of the loops embraced by the remainder of said base section, a generally cylindrical bore, and a pair of arms flaring from said base section at an angle corresponding generally with the flare of the arms of the fastener, one of said arms extending from said arched base section a distance greater than the other of said arms for engagement with the head of the bolt when said clip is assembled to the fastener, and a rod disposable within said generally cylindrical bore to assemble said clip to the fastener in generally parallel relation to embrace the inner surfaces of the loops, whereby when said clip is assembled to the fastener by said rod, said one arm engages the bolt to initially engage the rotation-preventing co-operating means of the bolt and the aperture in the one arm of the fastener.

3. Means for use in attaching to the end of a belt a plurality of fasteners each incorporating a pair of flaring arms which are interconnected by a series of loops adapted for engagement with a hinge pin and which have a plurality of aligned apertures for receiving a like plurality of bolts each having means engageable with means associated with the respective apertures in one of the arms to prevent rotation of the bolts relative to the fasteners, whereby when the bolts are passed through the apertures in the arms and through openings in the belt, a nut can be threadedly engaged with each of the bolts to tightly clamp the arms to the opposed faces of the belt, said attaching means comprising a clip including a substantially U-shaped plate having a resilient, arched base section with a curvature adapted for embracing the outer surfaces of the loops and inwardly turned saddle portions for defining, together with the inner surfaces of the loops embraced by the remainder of said base section, a generally cylindrical bore, and a pair of arms flaring from said base section at an angle corresponding generally with the flare of the arms of the fasteners, one of said arms extending from said arched base section a distance greater than the other of said arms for engagement with the heads of the bolts when said clip is assembled to the fasteners, and an aligning rod disposable within said generally cylindrical bore to assemble said clip to the fasteners in generally parallel relation, to embrace the inner surfaces of the loops, and to maintain the loops of the fasteners in alignment with one another during attachment of the fasteners to the belt, whereby when said clip is assembled to the fasteners by said rod the resilient characteristic of said base section serves to engage said one arm with the heads of the bolts to initially engage the rotation-preventing co-operating means of the bolts and the apertures in the one arm of the fasteners.

References Cited in the file of this patent

UNITED STATES PATENTS

| | | |
|---|---|---|
| 966,697 | Mitchell et al. | Aug. 9, 1910 |
| 1,610,315 | Purple | Dec. 14, 1926 |